United States Patent
Vohla et al.

(10) Patent No.: US 11,351,871 B2
(45) Date of Patent: Jun. 7, 2022

(54) ELECTROPNEUMATICALLY REGULATED CONTROL OF A CURRENT COLLECTOR

(71) Applicant: KNORR-BREMSE SYSTEME FÜR SCHIENENFAHRZEUGE GMBH, Munich (DE)

(72) Inventors: Manfred Vohla, Wein (AT); Kurt Haselsteiner, Möding (AT)

(73) Assignee: KNORR-BREMSE SYSTEME FÜR SCHIENENFAHRZEUGE GMBH

( * ) Notice: Subject to any disclaimer, the term of this patent is extended or adjusted under 35 U.S.C. 154(b) by 215 days.

(21) Appl. No.: 16/638,729

(22) PCT Filed: Jun. 28, 2018

(86) PCT No.: PCT/EP2018/067497
§ 371 (c)(1),
(2) Date: Feb. 12, 2020

(87) PCT Pub. No.: WO2019/029901
PCT Pub. Date: Feb. 14, 2019

(65) Prior Publication Data
US 2021/0129677 A1 May 6, 2021

(30) Foreign Application Priority Data
Aug. 11, 2017 (DE) ............... 10 2017 214 111.5

(51) Int. Cl.
*B60L 5/32* (2006.01)
*F15B 11/028* (2006.01)
*H01R 41/00* (2006.01)

(52) U.S. Cl.
CPC ............. *B60L 5/32* (2013.01); *F15B 11/028* (2013.01); *F15B 2211/50554* (2013.01);
(Continued)

(58) Field of Classification Search
CPC ................................. F15B 11/028; B60L 5/32
See application file for complete search history.

(56) References Cited

U.S. PATENT DOCUMENTS 5,115,405 A * 5/1992 Cathala .................... B60L 5/32
700/275
9,903,098 B2 * 2/2018 Vigholm ............. F15B 13/0433
(Continued)

FOREIGN PATENT DOCUMENTS

CN 101856975 A 10/2010
DE 2165813 A1 7/1973
(Continued)

OTHER PUBLICATIONS

International Search Report and Written Opinion for corresponding application PCT/EP2018/067497 dated Sep. 24, 2018.

*Primary Examiner* — Michael Leslie
(74) *Attorney, Agent, or Firm* — Barnes & Thornburg LLP

(57) ABSTRACT

The invention relates to a device for controlling and regulating a required pressing force from a current collector of a vehicle on an overhead line, a method for using such a device and a vehicle having at least one such device, wherein the device has a base control circuit, an additional control circuit and a working pressure control circuit. The base control circuit has a base control circuit adjustment device for adjusting a base pressure from a provided power pressure and the additional control circuit has a control device for adjusting an additional pressure from a provided power pressure, wherein the base pressure and the additional pressure act together to form a working pressure and to provide the required pressing force.

14 Claims, 2 Drawing Sheets

(52) U.S. Cl.
CPC . *F15B 2211/528* (2013.01); *F15B 2211/6316* (2013.01); *F15B 2211/6355* (2013.01); *F15B 2211/67* (2013.01); *H01R 41/00* (2013.01); *H01R 2201/26* (2013.01)

(56) References Cited

U.S. PATENT DOCUMENTS

| | | |
|---|---|---|
| 2015/0134157 A1 | 5/2015 | Aurich et al. |
| 2020/0271135 A1* | 8/2020 | Vohla .................... F15B 11/028 |
| 2021/0053446 A1* | 2/2021 | Aschauer ................ G01L 1/246 |
| 2021/0316612 A1* | 10/2021 | Blase ........................ B60L 5/36 |

FOREIGN PATENT DOCUMENTS

| | | |
|---|---|---|
| DE | 3128449 A1 | 1/1983 |
| DE | 10126042 A1 | 1/2002 |
| DE | 102004055030 A1 | 5/2006 |
| DE | 102012010519 B3 | 7/2013 |
| EP | 1539528 A1 | 6/2005 |
| EP | 1862347 A1 | 12/2007 |
| GB | 1417729 | 12/1975 |

* cited by examiner

ELECTROPNEUMATICALLY REGULATED CONTROL OF A CURRENT COLLECTOR

CROSS REFERENCE AND PRIORITY CLAIM

This patent application is a U.S. National Phase of International Patent Application No. PCT/EP2018/067497 filed Jul. 28, 2018, which claims priority to German Patent Application No. 10 2017 214 111.5, the disclosure of which being incorporated herein by reference in their entireties.

FIELD

Disclosed embodiments relates to a device for controlling a pressing force which is from a current collector of a vehicle (for example of a traction unit) and acts on an overhead line, to a method using such a device and to a vehicle having such a device.

BACKGROUND

Current collectors of electric traction units require a defined pressing force acting on the overhead line. In this context, the overhead line is an overhead line of conventional design or innovative design such as, e.g., ceiling-mounted conductor rails.

If this pressing force is too small, the current collector begins to jump. The resulting interruptions in contact and arcs adversely affect the service life of the current collector contact bars and overhead lines. If this pressing force is too large, the overhead line is raised excessively. When there are unacceptable applications of force into the overhead line, the mechanical positioning thereof cannot be ensured and typical consequences of this are that the current collector can become entangled and the overhead line can be torn down.

SUMMARY

Disclosed embodiments provide a device for controlling a pressing force between an overhead line and a current collector of a vehicle, which device is activated pneumatically or hydraulically. In this context, e.g. air or oil can be used as pressure media.

In accordance with disclosed embodiments, during the lifting or lowering of the current collector, the pressure of the media is in equilibrium with the force of gravity (weight) of the current collector. In accordance with disclosed embodiments, the required pressing force may be provided by increasing the pressure of a working pressure which is set by open-loop or closed-loop control or by both. In usual driving situations—within a tolerance band of the current collector pressing force—the working pressure may be applied only by a basic pressure. If the operating situation requires an additional pressing force, an additional pressure may be added to the basic pressure so that together they increase the working pressure.

BRIEF DESCRIPTION OF FIGURES

At least two exemplary embodiments are explained in more detail below with reference to the figures. In the figures.

DETAILED DESCRIPTION

Figure 1:
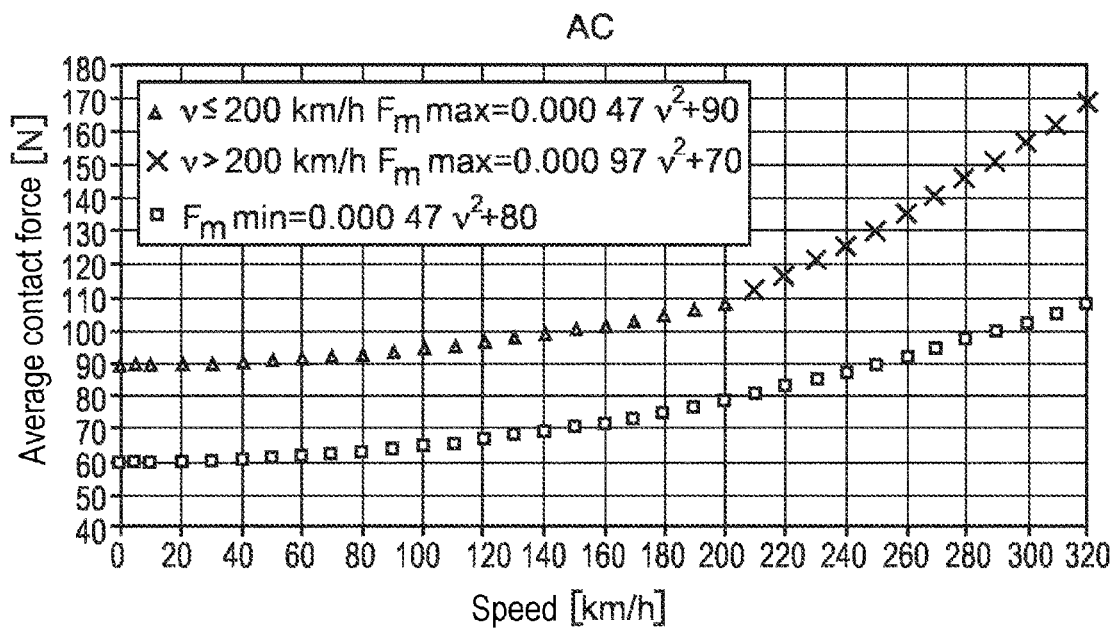
FIG. 1 shows the required pressing force in accordance with the vehicle speed according to the prior art.
Figure 2:
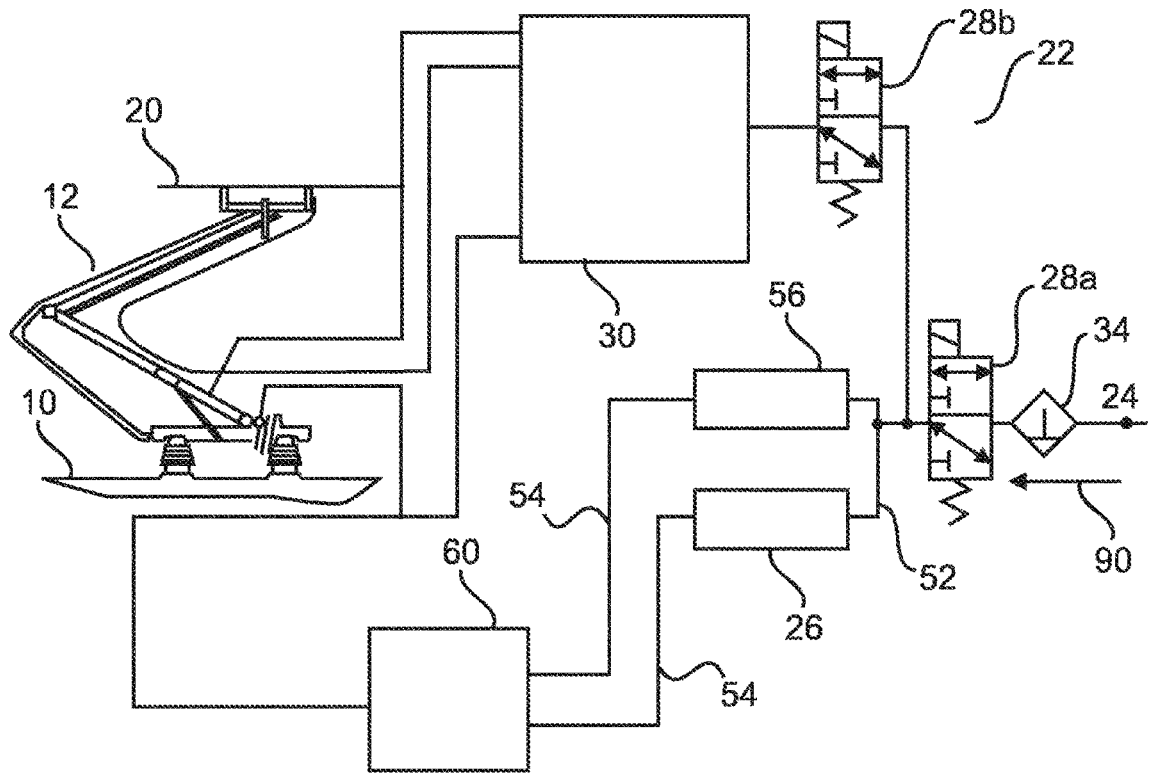
FIG. 2 shows a schematic illustration of a control device of a current collector according to a first exemplary embodiment.

According to DIN EN 50637:2012 the necessary pressing forces increase strongly up to approximately twice the stationary state value, in particular in the high-speed mode (>200 km/h), as shown in FIG. 1. In order to ensure this increase, according to the prior art air deflectors are used in the current collector, which air deflectors, on the one hand, apply an additional force aerodynamically and, on the other hand, compensate dynamic lifting forces. It is disadvantageous here that the configurations and handling of these air deflectors cannot be easily adapted to different operating situations. For example, the additional aerodynamic force is significantly higher in high-speed tunnels than on an open stretch of track. However, this additional force is also dependent on the shape of a vehicle, tunnel cross-section, obstruction dimensions (ratio of the cross-section of the vehicle to the tunnel cross-section), abrupt dimensional changes and the position of the current collector in the block train. This additional force is also dependent on the direction of travel (for example depending on the crabbing position or knee position of an asymmetrical single-arm current collector).

In addition, there are increasingly requirements to increase the current collector pressing force in the stationary state in order to avoid overheating and damage to the contact bar and overhead line wire at the contact point when there is a high current flow as result of illumination, air-conditioning systems and passenger information systems in vehicles which are made available. However, air deflectors cannot apply any additional force if the vehicle is in the stationary state.

Single-stage and two-stage (permanently set but adjustable) pressures are known now from the prior art. In individual cases, electropneumatic (ep) controlled pressure actuation systems as are already used, as known from e.g. from EP 1 539 528 A1. It is shown therein how the fallback level which is required by railway operators when the ep regulator is made faulty by a switching valve. In the event of a fault, an ep regulator is switched over to a permanently set, adjustable pressure reducing valve. The ep regulator controls the pressing force in the normal mode of the vehicle. It is disadvantageous here that the pressing force cannot be actuated precisely enough via the regulator, therefore bringing about a high level of consumption of air.

Disclosed embodiments provide a device and a method using such a device with which a more precise actuation of the required pressing forces between a current collector and an overhead line is possible which fit better with various operating situations.

This may be accomplished with a device for performing open-loop or closed-loop control of a pressing force between an overhead line and a current collector of a vehicle as disclosed.

In accordance with at least a first exemplary embodiment, the basic pressure and the additional pressure may be added in a working pressure control circuit in order to form the added pressure as the working pressure.

In accordance with at least a second exemplary embodiment, in addition a setting device is provided in order to add the basic pressure and the additional pressure there, in order to control the power pressure with the added pressure there, and in order to form a working pressure as a controlled power pressure. The advantage here is that the basic pressure and the additional pressure can be set with small cross sections, therefore small and constant volumes, wherein the power pressure and the working pressure are provided with large cross sections, therefore large and various volumes. A pilot control pressure regulating process can usually be transmitted 1:1 to the high-volume working pressure. In addition, in one embodiment variant a transmission ratio which is different than 1:1 can be implemented. For example, if the transmission ratio is selected to be 1:5, 10 bar act in the pilot control circuit with an output pressure of 2 bar at the output of the relay valve. In this case, a deviation is also reduced proportionately. If, for example, the deviation in the pilot control circuit is +0.1 bar, the deviation in the output of the relay valve is only +0.02 bar, which corresponds to an absolute reduction in the deviation, and therefore makes possible an increase in the control accuracy and a reduction in the hysteresis.

In accordance with disclosed embodiments, such a device is provided with a basic control circuit, an additional control circuit and a working pressure control circuit. The basic control circuit has a basic control circuit setting device (e.g. a pressure reducing valve) for setting the basic pressure. The additional control circuit has a control device (e.g. a regulator) for setting the additional pressure, wherein the basic pressure and the additional pressure are combined at an interface in order to output the working pressure into the working pressure control circuit where further elements for influencing pressure or volume flow can be interconnected. In addition, the working pressure control circuit can be configured in such way that the working pressure is limited to a maximum value in order to avoid an excessively high pressure acting on the current collector and/or the overhead line, in order to prevent damage.

In addition to the regulator, the additional control circuit optionally has a pressure sensor and two regulating valves. The pressure sensor is provided in order to make available pressure signals to the regulator of the additional control circuit. As result of a high-resolution of the pressure sensor, a low regulating level (low pressures) of the control device of the additional control circuit and a smaller tolerance (higher regulating accuracy) with a simultaneously smaller hysteresis can be implemented. The regulating valves serve not only to regulate the additional pressure but they are also configured in such a way that they can compensate any drifting of the basic control circuit setting device (of the basic pressure) in both directions (additional calibration function).

In one advantageous refinement provided by the disclosed embodiments, an automatic state machine is provided in order to monitor the basic pressure/the additional pressure/ the working pressure. If one of the pressures undershoots a minimum pressure specification, exceeds a maximum pressure specification or deviates from a bandwidth between the setpoint value and an actual value, a rapid shut-down takes place. The rapid shut-down acts on the additional control circuit and switches it off. The basic pressure is retained for the working pressure. Otherwise, complete venting of the working pressure can also occur by a main confirmation valve or by a piston valve which is located near to the current collector or by an emergency braking valve with an internal pressure comparison and reference pressure volume. Instead of an automatic state machine 80, for example an electric unit, electronic unit or microprocessor unit 81 (if appropriate with software which is classified according to a safety level) is also possible. Comparison signals for this monitoring device can be acquired from the pressure sensor of the additional control circuit.

A vehicle which is equipped with the device has improved and safer driving properties by virtue of a more precisely adapted pressing force between the overhead line and the current collector.

FIG. 1 shows part of the vehicle 10, a current collector 12, an overhead line 20 and a control device 22 according to the at least a first exemplary embodiment. The pressure medium air flows in the inflow direction 90 from a pressure input 24 into the control device 22 via an air filter 34.

If the vehicle 10 is operating or in the stand-by mode, the control device 22 is switched on via a switching valve 28a. A switching valve 28b and a device 30 constitute monitoring devices.

While the vehicle 10 is operating, a specific pressing force is required between the current collector 12 and the overhead line 20 in order to ensure a reliable transfer of energy from the overhead line 20 to the vehicle 10 via the current collector 12. This working pressure is achieved by the basic control circuit 56 and an additional control circuit 26 to form a working pressure regulating circuit 60.

A power pressure is fed to a first pressure medium line 52, the basic control circuit 56 and the additional control circuit 26. The basic control circuit 56 sets a basic pressure, and the additional control circuit 26 sets an additional pressure, wherein the basic pressure and the additional pressure are each fed into the working pressure regulating circuit 60 via, and in each case, a second pressure medium line 54, in order to form the working pressure there as an addition of the basic pressure and of the additional pressure.

Figure 3:
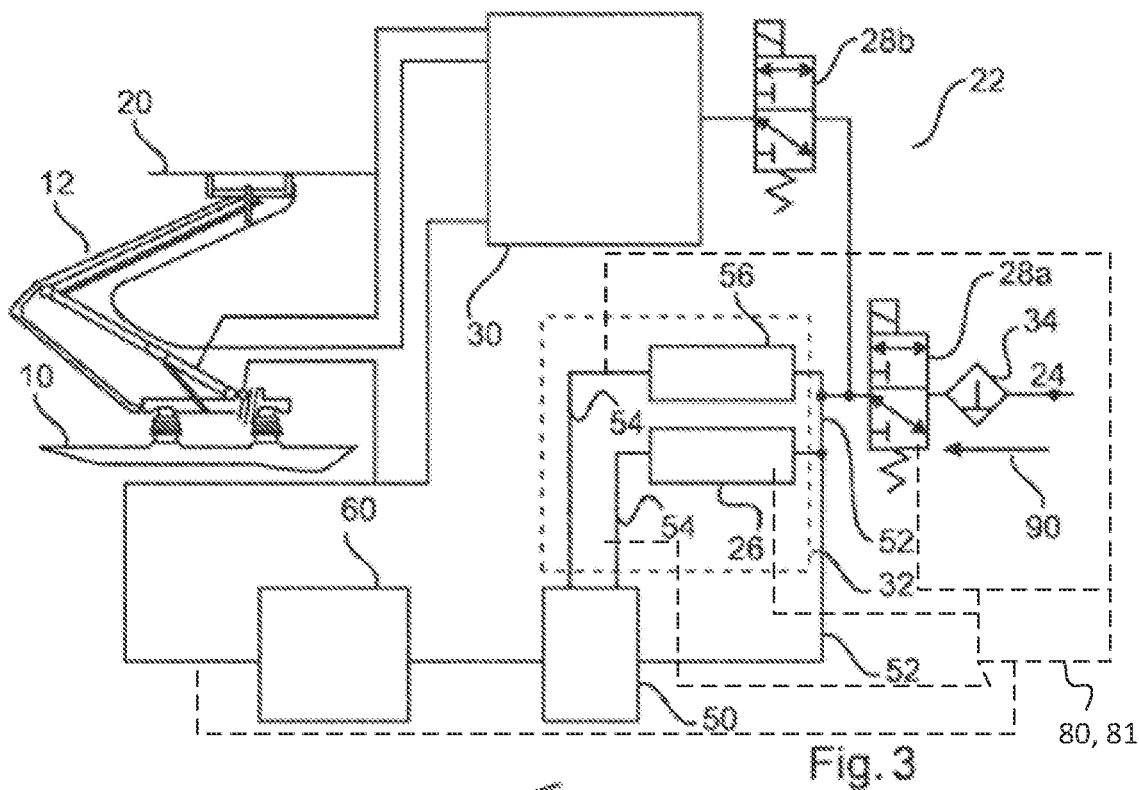
FIG. 3 shows a schematic illustration of a control device of a current collector according to at least a second exemplary embodiment.

FIG. 3 shows part of a vehicle 10, a current collector 12, an overhead line 20 and a control device 22 according to at least a second exemplary embodiment. The pressure medium air flows in the inflow direction 90 from a pressure input 24 into the control device 22 via an air filter 34.

If the vehicle 10 is operating or in the stand-by mode, the control device 22 is switched on via a switching valve 28a. A switching valve 28b and a device 30 constitute monitoring devices.

While the vehicle 10 is operating, a specific pressing force is required between the current collector 12 and the overhead line 20 in order to ensure a reliable transfer of energy from the overhead line 20 to the vehicle 10 via the current collector 12. This working pressure is obtained by a pilot control circuit 32 and a setting device (50) to form a working pressure regulating circuit 60.

The control circuit 32 has a basic control circuit 56, and an additional control circuit 26. A power pressure is fed to a first pressure medium line 52, the basic control circuit 56 and the additional control circuit 26. The basic control circuit 56 sets a basic pressure and the additional control circuit 26 sets an additional pressure, wherein the basic pressure and the additional pressure are fed on to the setting device 50 via, in each case, a second pressure medium line 54, in order to control the power pressure of the first pressure medium line 52 therein.

Figure 4:
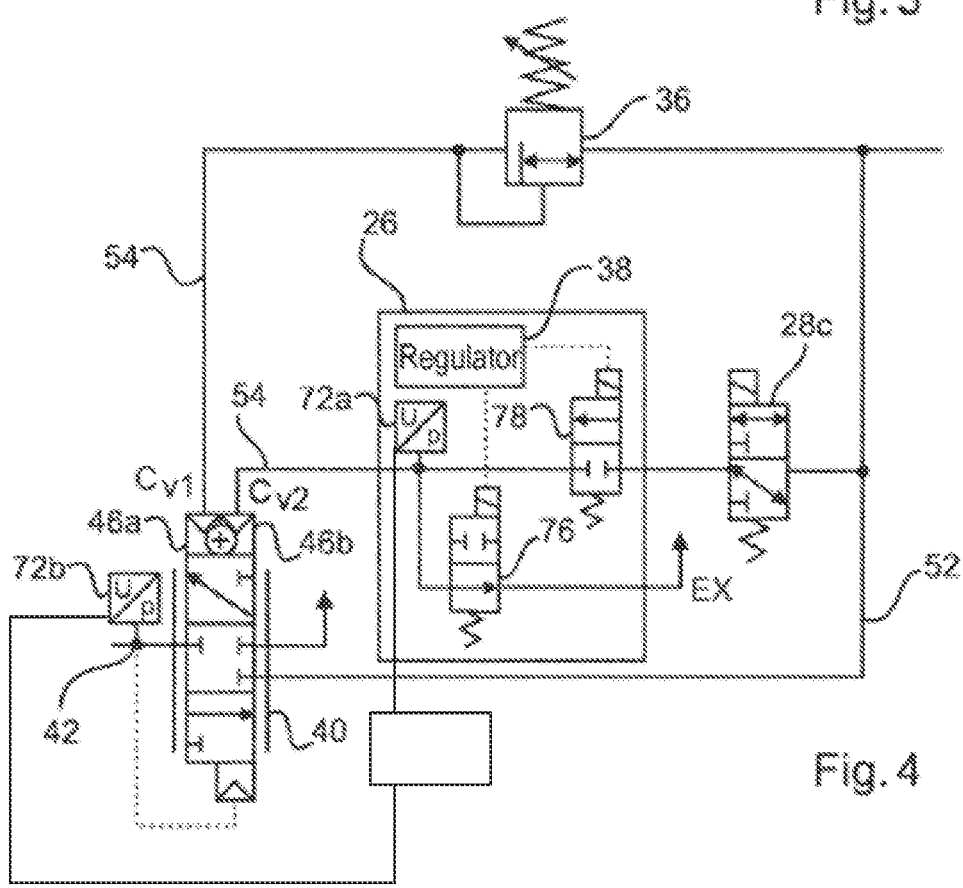
FIG. 4 shows a detailed illustration of a section of the control device according to at least the first exemplary embodiment.

FIG. 4 shows a detailed illustration of a section of the control device 22 in FIG. 3. The pilot control circuit 32 has a pressure reducing valve 36, a switching valve 28c, an additional control circuit 26 including a regulator 38, a pressure sensor 72a, a first relay valve 76 for reducing pressure, a second relay valve 78 for increasing pressure, a relay valve 40 and a pressure sensor 72.

The pressure reducing valve 36 is configured to set the basic pressure and the regulator 38 is configured to set the additional pressure, wherein the basic pressure and the additional pressure are each fed via the second pressure medium line 54 to inputs 46a and 46b of the relay valve 40. The relay valve 40 is configured in such a way that the basic pressure and the additional pressure are added downstream of the inputs 46a and 46b, in order to control the power pressure of the first pressure medium line 52 with the added pressure and to allow the working pressure to exit from an output 42 of the relay valve 40. The switching valve 28c is provided for switching off the additional control circuit in an emergency. The pressure sensors 72a and 72b are provided for measuring the additional pressure in the additional control circuit 26 and the working pressure at the output 42 of the relay valve.

LIST OF REFERENCE SIGNS

10 Vehicle
12 Current collector
20 Overhead line
22 Control device
24 Pressure input
26 Additional control circuit
28a, 28b, 28c Switching valve
30 Device
32 Pilot control circuit
34 Air filter
36 Pressure reducing valve
38 Regulator
40 Relay valve
42 Output of a relay valve
46, 46a, 46b Input of a relay valve
50 Setting device
52 First pressure medium line
54 Second pressure medium line
56 Basic control circuit
60 Working pressure control circuit
72a, 72b Pressure sensor
76 First regulating valve
78 Second regulating valve
90 Direction arrow

The invention claimed is:

1. A device for controlling a pressing force which is from a current collector of a vehicle and acts on an overhead line, wherein the pressing force is actuated by a pneumatic or hydraulic working pressure, the device comprising:
   a basic control circuit;
   an additional control circuit,
   wherein the basic control circuit has a basic control circuit setting device which is configured to set a basic pressure from a power pressure which is made available,
   wherein the additional control circuit has a regulator which is configured to set an additional pressure from a power pressure which is made available, and
   wherein the basic pressure and additional pressure are each input into and combined at a setting device to output a working pressure into a working pressure control circuit.

2. The device of claim 1, wherein the working pressure control circuit is configured such that the basic pressure and the additional pressure are added together and the added pressure sets the working pressure.

3. The device of claim 1, further comprising:
   a pilot control circuit in which the basic pressure and the additional pressure are controlled as pilot control pressures; and
   wherein the setting device is configured to set, in accordance with the basic pressure and the additional pressure from the pilot control circuit, a power pressure which is made available, and to output the power pressure as the working pressure into the working pressure control circuit.

4. The device of claim 3, wherein the basic control circuit setting device of the basic control circuit is a pressure reducing valve for setting the basic pressure.

5. The device of claim 3, wherein the control device of the additional control circuit is a regulator for setting the additional pressure.

6. The device of claim 3, wherein a switching valve is provided as a switch-on and switch-off valve in the power pressure circuit upstream of an introduction point for the power pressure into the pilot control circuit and the working pressure control circuit.

7. The device of claim 3, wherein the additional control circuit has a pressure sensor and two regulating valves with which the basic pressure can be calibrated in both directions.

8. The device of claim 1, wherein an automatic state machine is provided for monitoring the basic pressure, the additional pressure, or working pressure, which machine is configured such that the machine switches off the additional pressure and/or the basic pressure and/or the working pressure in defined situations.

9. The device of claim 1, further comprising an electric unit, an electronic unit or a microprocessor unit for monitoring the basic pressure, the additional pressure, or working pressure, which unit is configured in such a way that the unit switches off the additional pressure and/or the basic pressure and/or the working pressure in defined situations.

10. The device of claim 1, further comprising a switching valve provided upstream of the control device of the additional control circuit configured to switch off the additional control circuit in an emergency.

11. The device of claim 1 further comprising a switching valve provided downstream of the regulator of the additional control circuit configured to switch off the additional control circuit in an emergency.

12. A vehicle having at least one device as claimed in claim 1.

13. A method for controlling a pressing force which is from a current collector of a vehicle and acts on an overhead line, wherein the pressing force is actuated by a pneumatic or hydraulic power pressure, the method comprising:
   setting a basic pressure in a basic control circuit;
   setting an additional pressure in an additional control circuit;
   inputting adding the basic pressure and the additional pressure in a setting device; and
   introducing a working pressure into a working pressure control circuit,
   wherein the added pressure sets the working pressure.

14. A method for controlling a pressing force which is from a current collector of a vehicle and acts on an overhead line, wherein the pressing force is actuated by a pneumatic or hydraulic power pressure, wherein the power pressure is regulated by a pressure from a pilot control circuit, the method comprising:
   setting a pilot control basic pressure in a basic control circuit of the pilot control circuit to set the normal pressing force;

setting a pilot control additional pressure in an additional control circuit of the pilot control circuit to set an additional pressing force;

adding the pilot control additional pressure to the pilot control basic pressure, each input in a setting device, to form a resulting pressure in accordance with the respective driving situation; and regulating the power pressure by means of the added pressure.

\* \* \* \* \*